Figure 1:
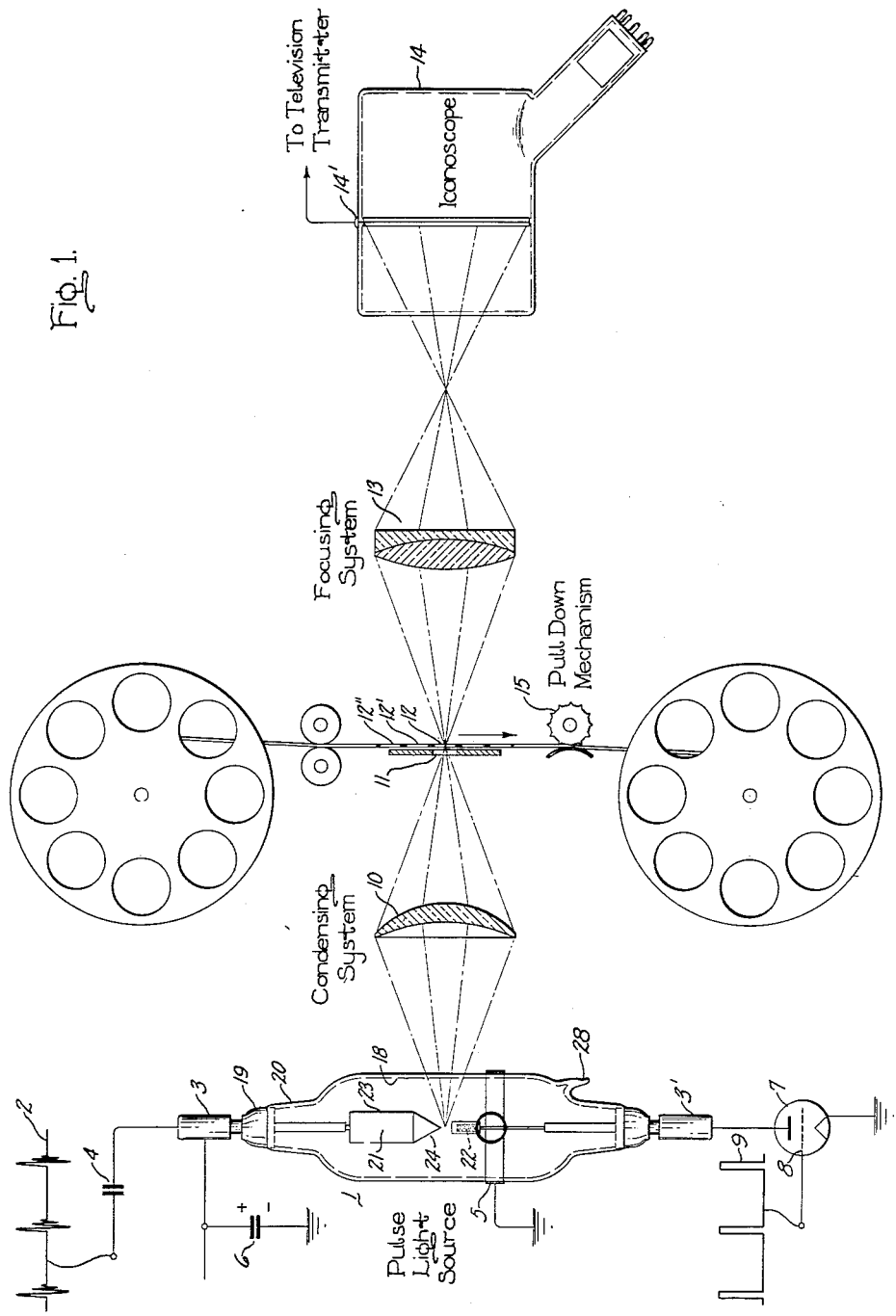

Dec. 13, 1955     E. B. NOEL     2,727,169
THERMIONIC ELECTRODE PULSE LAMP STRUCTURE
Filed March 22, 1950     2 Sheets-Sheet 1

Inventor:
Edward B. Noel,
by Vernet C. Kauffman
His Attorney.

Dec. 13, 1955  E. B. NOEL  2,727,169
THERMIONIC ELECTRODE PULSE LAMP STRUCTURE
Filed March 22, 1950  2 Sheets—Sheet 2
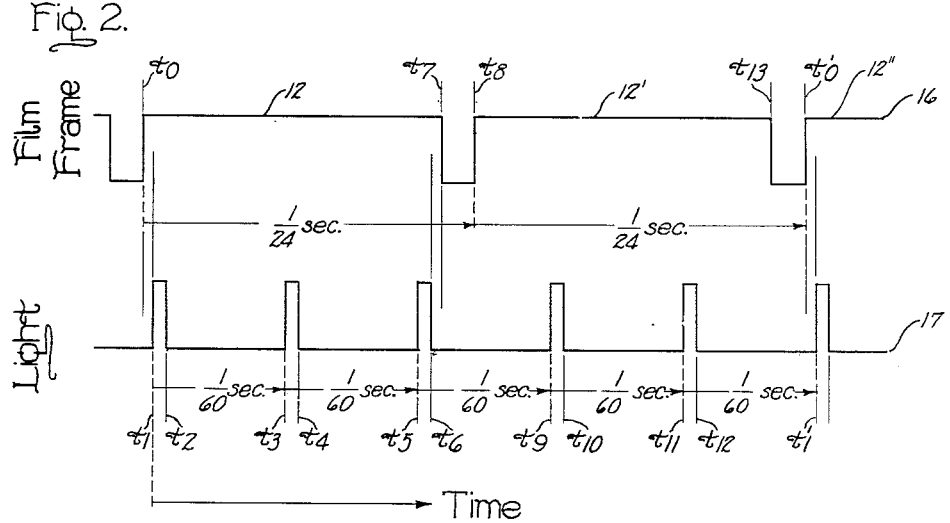
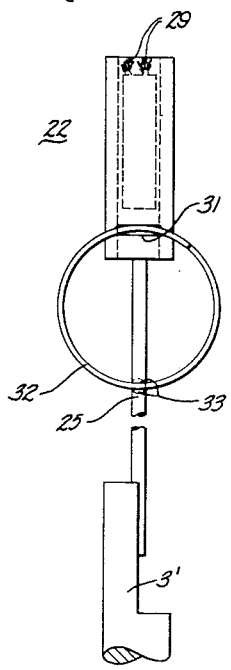
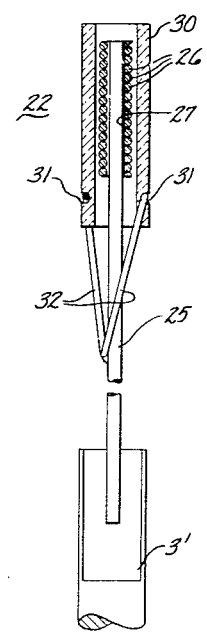
Inventor:
Edward B. Noel,
by Vernet C. Kauffman
His Attorney.

United States Patent Office 2,727,169
Patented Dec. 13, 1955

2,727,169

THERMIONIC ELECTRODE PULSE LAMP STRUCTURE

Edward B. Noel, Cleveland Heights, Ohio, assignor to General Electric Company, a corporation of New York Application March 22, 1950, Serial No. 151,097

5 Claims. (Cl. 313—38)

My invention relates to gaseous electric discharge lamps generally, and more particularly to electrode structures for such lamps designed for repetitive pulse flashing.

In connection with the transmission of standard motion picture film over television systems, there has lately arisen a demand for a flash lamp capable of successfully withstanding repeated applications of tremendously high energy loadings, and on which very stringent requirements of constancy in operation have been imposed.

The film televising system, for which the lamp in accordance with the present invention was designed, requires the generation of short pulses of light of high intensity and constant brilliancy at a repetition rate of 60 cycles per second, the pulses having a time duration less than 5 per cent of the repetition interval. The system, moreover, requires that the illumination from the source be substantially extinguished during the intervals between the pulses or flashes. If the light is not extinguished between the flashes, there occur what are known as "travel ghosts" on the television image screen. These are due to the fact that, as the film is moved or pulled down during certain intervals between the flashes, unless the illumination is extinguished during the time of film travel, the lighter portions of the film will appear as bright streaks on the television screen.

Accordingly, it is an object of my invention to provide an electric discharge lamp having an improved thermionic cathode structure which substantially eliminates light radiations from the incandescent cathode in between flashes or pulses of light generated by means of an arc discharge between said cathode and an anode.

A further object of my invention is to provide a lamp having a thermionic cathode shielded in such manner that the projection of light resulting from the incandescence thereof is substantially eliminated throughout a wide viewing angle.

In accordance with my invention, I achieve these objects by means of a lamp having a cathode of the thermionic emission type, in which a core metal of low work function and high emissivity such as thorium, is associated with a protective winding of a metal of higher work function, such as tungsten. In order to eliminate the radiation of light resulting from the incandescence of the cathode during the intervals between flashes, I surround the cathode with a sleeve of a highly refractory material such as quartz. This sleeve serves to confine growths of deposited electrode metal, to cut off undesired light, and to retain heat in the cathode during the intervals between flashes, so that, to a certain extent, it also stabilizes the operation of the lamp. The sleeve fits quite tightly around the cathode and projects a short distance beyond the front face thereof, as will be more fully explained hereafter.

For further objects and advantages and for a better understanding of my invention, attention is now directed to the following description and to the accompanying drawings. The features of my invention believed to be novel will be more particularly pointed out in the appended claims.

In the drawings:

Fig. 1 contains an elevation view of a discharge lamp provided with a shielded thermionic cathode structure in accordance with my invention. The lamp is shown in connection with a generalized schematic diagram of a film televising system, in order to illustrate the practical application of the invention to the generation of pulses of light of the type required by the system.

Fig. 2 contains a pair of curves providing a graphical representation of the timing of the film pull-down mechanism and of the light pulse source in the system of Fig. 1.

Fig. 3 is a front elevation on an enlarged scale of the cathode structure of the lamp of Fig. 1, and Fig. 4 is a sectional side view of the same.

Referring to Fig. 1, there is shown an electric discharge lamp 1 adapted to emit flashes of light of high intensity when voltage pulses are applied across the electrodes thereof. In common with devices of this type, it is generally necessary that a voltage pulse, of considerably higher magnitude than that required to sustain a discharge between the electrodes, be applied to the lamp for causing initial ionization thereof in order to start the discharge. These ionizing pulses may consist of short trains of damped high frequency oscillations, as represented by curve 2, and they are applied to terminal post 3 through a coupling capacitor 4. A grounded capacitive band 5, located around the bulb of lamp 1, serves as the other terminal in connection with the applied ionizing pulses. A constant positive unidirectional voltage is applied to post 3 from an energy storage capacitor 6, wherein the charge is accumulated by a suitable rectifying system not shown in the diagram. The lamp 1 is connected across capacitor 6 in series with a control device 7 which may, for instance, be a triode electronic discharge tube. Tube 7 is provided at its control electrode or grid 8 with positive pulses of voltage of rectangular wave form as illustrated by curve 9. The ionizing pulses 2 start the discharge within lamp 1 sometime during the occurrence of the positive pulses 9, and the discharge occurs through the lamp up to the trailing edge of each individual positive pulse.

The pulses of light are collected over a wide angle by means of a lens-condensing system 10 and projected through a suitable rectangular aperture 11 onto a film frame 12. Thereafter a focusing lens system 13 produces an enlarged image of the film frame on the receiving screen of an iconoscope or camera tube 14, whose output at terminal 14' may be supplied to a television transmitter in conventional manner. The film travels intermittently past the aperture 11 and is controlled by means of a pull-down mechanism 15 in well-known fashion. It will be observed that no shutter has been provided in connection with the pull-down mechanism and the aperture for the film. Such a system has great advantages for television purposes: since there is less energy on the film it may be stopped on any frame without danger of burning the film; the television image may be shaded while the film is stopped; moreover, the system has practically no inertia and may be started or stopped almost instantaneously during intermissions between telecasts.

The film, in accordance with standard practice in the moving picture industry, is designed to be projected at the rate of 24 frames per second. Thus, in a conventional projector, a shutter would be provided between the condensing system 10 and the rectangular aperture 11, and this shutter would be operated in synchronism with the pull-down mechanism 15 to interrupt the light 24 times per second, or a multiple thereof, during the intervals when the film is pulled down in order to bring the succeeding frames 12' and 12" before the aperture 11.

In the present film televising system, the problem is more complicated by the fact that the cathode ray sweeping over the screen or cathode of the iconoscope 14 has a repetition or vertical sweep frequency of 60 frames per second. The reconciliation of these two frequencies may be understood with reference to Fig. 2, wherein curve 16 represents the intermittent movement of the film frames before the aperture 11, and curve 17 represents the pulses of light produced by lamp 1. It will be observed that one particular film frame stays in front of the aperture 11 for a period of time which is slightly less than the $\frac{1}{24}$ of a second occurring between the successive frames. Thus, the frame 12, which has been illustrated in the operative position in Fig. 1, may be assumed to move thereto at time $t_0$ and to stay in place up until time $t_7$. From time $t_7$ to $t_8$ the pull-down mechanism operates and moves the next frame 12' into the operative position, the interval from $t_0$ to $t_8$ being $\frac{1}{24}$ of a second. The succeeding frame 12' remains in position until time $t_{13}$, and at the next $\frac{1}{24}$ of a second frame 12" is pulled down into the operative position.

The pulsing mechanism for lamp 1 is timed to operate in the manner illustrated by curve 17, that is, it provides pulses of short time duration at intervals of $\frac{1}{60}$ of a second apart, the first pulse in a group of five occurring very soon after the initial instant of the pull-down of a film frame, that is, at time $t_1$ in the diagram. Thus, it will appear that three pulses of light are transmitted through film frame 12, the last pulse of the three occurring just before frame 12 is pulled down to make way for the succeeding frame 12'. The succeeding frame 12', on the other hand, receives but two pulses of light and the third frame here considered, 12" receives three pulses in the same manner as the first frame 12. Thus, the film system and the pulse system are maintained in synchronism by the expedient of making two film frames correspond to five pulses of light. In between the generation of the pulses of light, that is, during the time intervals $t_2$ to $t_3$, $t_4$ to $t_5$, $t_9$ to $t_{10}$, etc., the cathode beam sweeps the picture screen of the iconoscope and produces the light-modulated signal at terminal 14' for transmission by the television transmitter. It will be understood that iconoscope 14 operates on the storage principle and that the actual instant of generation of light pulses is utilized for the generation of the usual frame or vertical synchronizing signals in the transmitting equipment.

In my co-pending application Serial No. 151,098, filed March 22, 1950, entitled "Cold Electrode Pulse Lamp Structure," and assigned to the same assignee as the present invention, I have described a gaseous discharge lamp, generally similar in form and size to lamp 1 illustrated herein, and in which massive electrodes of the field emission type are utilized. The electrodes in the above application have conical tips, consisting preferably of a tungsten-nickel-barium alloy which may have a composition of approximately 89 per cent tungsten, 10 per cent nickel, and 1 per cent barium. These electrodes, or at any rate the cathode therein, operate partly through field emission and partly through the formation of a hot spot on the conical tip thereof; such at any rate is the commonly accepted theory, though it is to be understood that it is not stated here as an uncontrovertible fact. The difficulty in utilizing that type of cathode with the film televising system illustrated herein, was that of keeping the arc stable within the optical axis. The cathode hot spot had a tendency to jump from side to side of the conical tip, and in doing so would cause a variation in the intensity of the light projected by the condensing system on the film, which would, in turn, cause an objectionable flicker of the image on the television screen at the receivers. This objectionable characteristic was eliminated by means of a cover or cap of a refractory insulating material located over the cathode and fitting quite snugly thereon, and provided with a hole or perforation at the tip of the conical point of the cathode.

With the present invention a different form of lamp is used in which the cathode is of the thermionic emission type. Thus, lamp 1 comprises a tubular light-transmitting bulb 18 which may be made of quartz or of a hard glass having a high melting point and low coefficient of expansion. The bulb is provided with tubular necks at either end, to each of which is sealed a terminal structure comprising a heavy rigid lead-in conductor in the form of a prong 3 and 3', of cold rolled steel for example, having brazed thereto a thin metal ferrule 19 the rim of which is fused into the end of the neck 20. The ferrule may be made of a suitable alloy capable of hermetically sealing to the glass bulb, for example, an iron-nickel-cobalt alloy, as is well known.

At the center of the bulb is an arc gap preferably about 3 to 4 mm. wide between a massive anode 21 and a relatively small cathode 22 of the thermionic emission type. Anode 21 has a support or body portion 23 which is fixed to an extension of the prong 3 by suitable brazing or spot welding. The forward end of anode 21 is formed into a conical tip portion 24 whose apex is in alignment with the cathode.

Referring to Figs. 3 and 4, the cathode 22 comprises a stem 25 which may be composed of a refractory metal wire, such as tungsten or tantalum. The upper portion of stem 25 has a helix 26 of a like refractory metal, preferably tungsten wire, coiled around and fitting quite tightly. A small elongated piece or sliver of thorium metal 27 is inserted between the stem 25 and the helix 26.

The bulb 18 contains a suitable ionizable medium, such as a filling of argon, krypton, xenon, or mixtures of those gases with hydrogen. A presently preferred filling is xenon at a pressure of 600 mm. of mercury in a bulb 1¼ inches in diameter and about 3 inches long. The bulb with its filling at near-atmospheric pressure is tipped off or sealed at the tabulation 28 by methods well known in the art.

Upon the initial application of electrical energy to the electrodes 21 and 22, they are substantially cold and the resulting glow discharge therebetween is the result of the impression of a potential in excess of the break-down voltage of the specific filling gas. As a result of the glow discharge initially occurring, the cathode is subjected to ionic bombardment and is rapidly heated to incandescence which may occur within a few seconds following the initial application of the pulses. Upon incandescence of the cathode, the core or sliver 27 of thermionically active metal, such as thorium, apparently causes a thin film of thorium to diffuse onto the surface of the tungsten helix 26. The tungsten helix thus becomes highly electron emissive, because thorium has a much lower function than tungsten, that is to say, it requires less energy to emit electrons. The arc is thereafter maintained with little sputtering or destruction of the cathode. The helix 26 has the desirable property of protecting the thorium sliver 27 from rapid evaporation or sputtering, which would otherwise deleteriously affect the envelope or bulb 18 by the formation of a black light-absorbing film of sputtered or deposited metal on the interior surface thereof.

The cathode 22, as so far described, has a very objectionable feature in the present use of the lamp, which feature results inherently from the fact that the cathode depends upon incandescence for the desired thermionic emission. The very fact that the cathode 22 and, in particular, the upper or forward face thereof is incandescent, produces a residual or direct component of light which persists even in the absence of pulses of voltage for producing the arc discharge; that is, the light is not completely interrupted between pulses but continues to a reduced extent.

For this particular use in film televising, the objectionable result occurring may be understood with reference to Fig. 2. During the interval from time $t_7$ to $t_8$, the film frame 12 is pulled down to make way for the succeeding frame 12'. During this interval, the film frames are in motion in front of the aperture 11, and if any light is being transmitted therethrough as, in fact, there is with the cathode so far described, the lighter portions of the film will affect the image screen of the iconoscope. The result will be the production of "travel ghosts" on the television receiver screen which are, in fact, vertical bands of light corresponding to the motion of the bright portions or highlights of the film before the aperture.

In order to eliminate these "travel ghosts," which are really the result of the residual component of light produced by the incandescence of the cathode, it might be thought that the cathode could be operated at a lower temperature. However, this offers no solution because the arc then tends to wander and flickering occurs. Again it might be thought that a simple screen on the bulb 18 of the lamp would suffice. However, when lamp 1 is used in conjunction with the wide angle condensing system 10 as shown in Fig. 1, if such a screen is used, a large proportion of the light from the arc would necessarily also be cut out, so that the useful light therefrom would be unreasonably decreased. I have also observed that whereas the upper face of the incandescent cathode is quite active in the production of this residual component of light, an even greater amount is produced by deposits or growths of tungsten metal 29 on the cathode, which are commonly referred to as "tree growths." These "tree growths" are, in fact, nothing but crystalline deposits of tungsten metal which grow out haphazardly from the turns of the helix 26. These "tree growths" incandesce very brightly and produce even more light than the upper face of the cathode.

In accordance with my invention, the residual component of light from the upper face of the cathode, and also that which is caused by the "tree growths," is eliminated by surrounding the helix 26 with a cylindrical sleeve 30 of a highly refractory insulating material such as quartz. The sleeve fits quite tightly over the helix 26 and projects a distance approximately equal to the diameter of helix 26 above its upper face. The sleeve is grooved at 31 near its lower edge, and is secured in place by means of a spring clip 32 which is spot welded at 33 to the stem 25.

In operation the refractory sleeve 30 forces any "tree growths" that do occur, to form on the upper face of the helix 26 and to build up within the hollow cavity formed by the projection of sleeve 30 beyond the upper face of the helix. Within a few hours after such a cathode is initially placed in operation, the inside surface of the refractory insulating sleeve 30 becomes coated with sputtered metal from the cathode, so that it is blackened and becomes opaque to light. Thus, the upper face of cathode 22 and also any "tree growths" that form thereon are shielded from the light-condensing system, and the residual component of light resulting from incandescence persisting in between light pulses is substantially eliminated.

I have found that clear fused crystal quartz is a satisfactory material for sleeve 30. However, other highly refractory insulating materials may be used such as alumina, beryllia, magnesia, thoria, and zirconia. Of the above materials alumina appears to be the most advantageous both from the point of view of its low cost and also due to the fact that it is relatively opaque, and not so dependent upon the deposit of sputtered metal to provide opacity as is quartz.

I have found that sleeve 30 has also the very desirable effect of forcing the arc to occur on the upper face of cathode 11 and prevents it from striking down the side on one of the lower turns of the helix. It thus conserves heat within the upper turns of the helix and serves also, to a certain extent, to stabilize the arc and to prevent it from shifting about the optical axis and producing flickering of light on the film and, consequently, upon the television receiver.

The lamp in accordance with the present invention, and also those in accordance with my co-pending application entitled "Cold Electrode Pulse Lamp Structure," have, for the first time, made practical the film television system described herein. Previously, it had been impossible to produce a televised image sufficiently free from flicker and "travel ghosts" to render this system competitive with the more conventional systems, in which the light from a constant source is mechanically interrupted by a shutter. My present invention has permitted a reversal of this situation, and enables the present system to compete on very favorable terms with the conventional shutter systems.

While a certain specific embodiment of the lamp has been shown and described, it will be understood that various modifications may be made without departing from the invention. Thus, to mention but the most obvious one, it will of course be understood that my cathode structure may be used for both electrodes, in which case the lamp can be used with either polarity. The appended claims are therefore intended to cover any such modifications coming within the true spirit and scope of the invention.

What I claim as new and desire to secure by Letters Patent of the United States is:

1. A high pressure electric discharge lamp comprising a light-transmitting envelope containing an ionizable gaseous filling, a pair of electrodes oppositely mounted within said envelope and defining an arc path less than the transverse diameter of the envelope part surrounding them, one of said electrodes being of the thermionic type and comprising a metal of low work function and high electron emissive properties when heated, and surrounded by a wire helix of a refractory metal of higher work function shielding said electron emissive metal from positive ion bombardment, and a tubular sleeve of a refractory insulating substance surrounding and fitting snugly over said helix and having an open end projecting beyond the forward face thereof in the direction of said other electrode in order to prevent the radiation of light resulting from incandescence of said thermionic electrode.

2. An electric arc discharge lamp comprising a light-transmitting envelope containing a filling of ionizable gases at near atmospheric pressure and a pair of electrodes oppositely mounted within said envelope and defining a high intensity arc path shorter than the transverse diameter of the envelope part surrounding them, one of said electrodes being of the thermionic type and comprising a core metal of low work function and high electron emissive properties when heated, and surrounded by a wire helix of a refractory metal of higher work function shielding said electron emissive core from positive ion bombardment, and a tubular sleeve of a refractory insulating substance surrounding and fitting snugly over said helix and having an open-ended portion projecting beyond the forward face thereof in the direction of said other electrode, said projecting portion thereby forming a cavity for receiving said arc and for confining growths of deposited refractory metal resulting therefrom, said projecting portion serving also to cut off residual light caused by the incandescence of said forward face and of said refractory metal growths.

3. An electric arc discharge lamp comprising a light-transmitting envelope containing a filling of ionizable gases at near atmospheric pressure and a pair of electrodes oppositely mounted within said envelope and defining a high intensity arc path shorter than the transverse diameter of the envelope part surrounding them, one of said electrodes being of the thermionic type and comprising a stem and a surrounding wire helix of metal having a relatively high work function, and a core sliver of metal of relatively low work function and possessing high electron emissive properties when heated, said core sliver being inserted between said stem and said helix, which helix shields said electron emissive metal from positive ion bombardment, and a tubular cylindrical sleeve of a refractory insulating substance surrounding and fitting snugly over said helix and having an open-ended portion projecting beyond the forward face thereof in the direction of said other electrode, said projecting portion thereby forming a cylindrical cavity for receiving said arc and for confining therein growths of deposited electrode metal resulting from said arc, said projecting portion serving also to cut off, throughout a wide viewing angle, residual light caused by the incandescence of said thermionic electrode and of said electrode metal growths.

4. An electric arc discharge lamp comprising a light-transmitting envelope containing a near-atmospheric filling of a gas from the group including argon, krypton, xenon, hydrogen and mixtures thereof, and a pair of electrodes oppositely mounted in alignment within said envelope and defining a high intensity arc path shorter than the transverse diameter of the envelope part surrounding them, at least one of said electrodes being of the thermionic type and comprising a core of thorium having a low work function and high electron emissive properties when heated, and surrounded by a wire helix of a refractory metal of higher work function shielding said thorium core from positive ion bombardment, and a tubular cylindrical sleeve of a refractory insulating substance surrounding and fitting snugly over said helix and having an open-ended portion projecting beyond the forward face thereof in the direction of said other electrode, said projecting portion thereby forming a cylindrical cavity for receiving said arc and for confining therein growths of deposited electrode metal resulting from said arc, said projecting portion serving also to cut off, throughout a wide viewing angle, residual light caused by the incandescence of said thermionic electrode and of said electrode metal growths.

5. An electric arc discharge lamp comprising a light-transmitting envelope containing a near-atmospheric filling of a gas from the group including argon, krypton, xenon, hydrogen and mixtures thereof, and a pair of electrodes oppositely mounted in alignment therein and defining an arc path shorter than the transverse diameter of the envelope part surrounding them, at least one of said electrodes being of the thermionic type and comprising a stem and a surrounding wire helix of a refractory metal having a relatively high work function, and a core sliver of thorium, of relatively low work function, inserted between said stem and said helix, said helix shielding said core from positive ion bombardment, and a tubular cylindrical sleeve of a highly refractory insulating substance surrounding and fitting snugly over said helix and having an open-ended portion projecting beyond the forward face thereof in the direction of said other electrode, said projecting portion thereby forming a cylindrical cavity for receiving said arc and for confining therein growths of deposited electrode metal resulting from said arc, said projecting portion serving to cut off, throughout a wide viewing angle, residual light caused by the incandescence of said thermionic electrode and of said electrode metal growths.

References Cited in the file of this patent
UNITED STATES PATENTS

| | | |
|---|---|---|
| 1,634,201 | Masolle | June 28, 1927 |
| 1,879,740 | Gross | Sept. 27, 1932 |
| 1,932,025 | Thomas | Oct. 24, 1933 |
| 1,986,462 | Brandt, Sr. | Jan. 1, 1935 |
| 2,046,941 | Gaidies | July 7, 1936 |
| 2,087,735 | Pirani | July 20, 1937 |
| 2,104,652 | Inman | Jan. 4, 1938 |
| 2,177,714 | Hagen | Oct. 31, 1939 |
| 2,229,329 | Kaspar | Jan. 21, 1941 |
| 2,238,277 | Miller | Apr. 15, 1941 |
| 2,241,345 | Gustin | May 6, 1941 |
| 2,367,595 | Marden | Jan. 16, 1945 |
| 2,460,738 | Francis | Feb. 1, 1949 |